US012576812B2

(12) United States Patent
Ette

(10) Patent No.: US 12,576,812 B2
(45) Date of Patent: Mar. 17, 2026

(54) APPROACH DETECTION

(71) Applicant: VOLKSWAGEN AKTIENGESELLSCHAFT, Wolfsburg (DE)

(72) Inventor: Bernd Ette, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 103 days.

(21) Appl. No.: 18/719,649

(22) PCT Filed: Nov. 21, 2022

(86) PCT No.: PCT/EP2022/082602
§ 371 (c)(1),
(2) Date: Jun. 13, 2024

(87) PCT Pub. No.: WO2023/110302
PCT Pub. Date: Jun. 22, 2023

(65) Prior Publication Data
US 2025/0050839 A1 Feb. 13, 2025

(30) Foreign Application Priority Data
Dec. 14, 2021 (DE) .................... 10 2021 214 340.7

(51) Int. Cl.
B60R 25/24 (2013.01)
G07C 9/00 (2020.01)
H04W 4/02 (2018.01)
(52) U.S. Cl.
CPC ........ B60R 25/245 (2013.01); G07C 9/00309 (2013.01); H04W 4/025 (2013.01);
(Continued)

(58) Field of Classification Search
None
See application file for complete search history.

(56) References Cited

U.S. PATENT DOCUMENTS 9,154,920 B2 10/2015 O'Brien et al.
10,183,650 B2 1/2019 Verkin et al.
(Continued)

FOREIGN PATENT DOCUMENTS

CN 107650862 A 2/2018
CN 111148023 A * 5/2020 ............ H04W 4/023
(Continued)

OTHER PUBLICATIONS

International Search Report; International Patent Application No. PCT/EP2022/082602; Feb. 17, 2023.

*Primary Examiner* — Carlos Garcia
(74) *Attorney, Agent, or Firm* — BARNES & THORNBURG LLP

(57) ABSTRACT

A method for determining an approach of a person toward a transportation vehicle, a computer program, an apparatus, and a system. In response to UWB technology or other radio-based distance systems being used for the Kessy access, the distance information relating to a user is gathered. In response to the access device containing an acceleration sensor, the movement sequence relating to the distance information is analyzed. The magnetic orientation of a transportation vehicle is known when the transportation vehicle is parked, and this information is included in the analysis. In the course of the calculation, directional vectors are included in the approach detection, and the individual positions are easily calculated.

16 Claims, 5 Drawing Sheets

(52) U.S. Cl.

CPC .................. *B60R 2325/205* (2013.01); *G07C 2009/00793* (2013.01); *G07C 2209/63* (2013.01)

(56) References Cited

U.S. PATENT DOCUMENTS

| | | | |
|---|---|---|---|
| 10,800,380 | B2 | 10/2020 | Weghaus et al. |
| 11,276,259 | B2 | 3/2022 | Ette |
| 12,307,824 | B2* | 5/2025 | Groß .................... G06V 10/751 |
| 2012/0182145 | A1* | 7/2012 | Jameson ............. A01K 11/008 |
| | | | 340/539.13 |
| 2014/0340193 | A1 | 11/2014 | Zivkovic et al. |
| 2017/0327083 | A1 | 11/2017 | Verkin et al. |
| 2019/0017839 | A1* | 1/2019 | Eyler ................. G01C 21/3647 |
| 2019/0135229 | A1 | 5/2019 | Ledvina et al. |
| 2020/0198581 | A1 | 6/2020 | Ette |
| 2022/0394101 | A1* | 12/2022 | Feinmesser ........... H04L 67/535 |
| 2023/0171298 | A1* | 6/2023 | Russell ............ H04N 21/26208 |
| | | | 709/231 |

FOREIGN PATENT DOCUMENTS

| | | | |
|---|---|---|---|
| DE | 10046571 | A1 | 5/2002 |
| DE | 102013225600 | A1 | 9/2014 |
| DE | 102015109468 | A1 | 12/2016 |
| DE | 102016207997 | A1 | 11/2017 |
| DE | 102019211192 | A1 | 1/2021 |
| WO | 2016043951 | A1 | 3/2016 |

* cited by examiner

APPROACH DETECTION

This patent application is a U.S. National Phase of International Patent Application No. PCT/EP2022/082602, filed 21 Nov. 2022, which claims priority to German Patent Application No. 10 2021 214 340.7, filed 14 Dec. 2021, the disclosures of which are incorporated herein by reference in their entireties.

SUMMARY

Illustrative embodiments relate to a method for determining an approach of a person to a transportation vehicle; a corresponding computer program and a corresponding device and a system.

BRIEF DESCRIPTION OF THE DRAWINGS

Disclosed embodiments will be described in more detail below with reference to drawings, in which.

DETAILED DESCRIPTION

Figure 1:
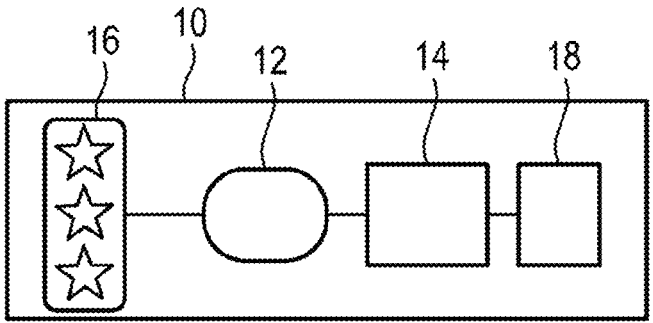
FIG. 1 shows a schematic representation of a device for determining an approach of a person to a transportation vehicle.

For keyless access to a transportation vehicle, UWB technology is used between an electronic device, such as a smartphone and/or a transportation vehicle key with radio-based remote control, and the transportation vehicle. The general term for this is Kessy, Keyless Entry and Exit. Kessy allows the control of flaps and doors on the transportation vehicle. Known solutions are UWB-Ranging, in which triangulation is performed on the measured distances to a smart mobile from a transportation vehicle with multiple UWB-antennas. Furthermore, there are sector-based systems in which, by energizing a plurality of coils, sub-regions are formed around and within the transportation vehicle to assign a device. Furthermore, it is known to locate an electronic device by radar, a camera, or IF optics. Based on the existing methods, it is known to reduce errors in approach detection by increasing the number of antennas. Such systems therefore require high computing power due to the uncertainty of measurements and visibility of various devices around the transportation vehicle. Self-learning algorithms are often used. Furthermore, the number of UWB-antennas on the transportation vehicle cannot be minimized because a certain amount of redundancy is required in the system.

The unexamined application US 2019 0135 229 A1 relates to the use of two different wireless protocols to determine a distance between a mobile device and an access control system (for example, a transportation vehicle). The first wireless protocol (for example, BLUETOOTH®) can be used to authenticate the transportation vehicle and exchange distance measurement capabilities between a mobile device (such as a phone or clock) and the transportation vehicle. The second wireless protocol (for example, ultra-wideband, UWB) can use a pulse width that is less than the pulse width used by the first wireless protocol. The narrower pulse width can provide greater accuracy for distance (range) measurements. The drawback here is that only distance information can be determined via the protocols. In particular, neither orientation nor directional information can be determined.

The unexamined application US 2014 340 193 A1 relates to a passive keyless system with a base that selectively allows access to a restricted environment using a base transceiver. The base transceiver operates with an encrypted connection on first and second frequencies. The passive keyless system also comprises a base-recording element that stores base information about the measured movement history. In addition, a passive keyless device with at least one sensor detects a movement property of the device, a device recording element stores movement history information about the device and reflects the detected movement property. A device transceiver communicates with the base transceiver, wherein base transceiver security information identifies the device according to a passive keyless protocol and/or the movement history information. An access request element causes the device transceiver to request access to the base transceiver. The base uses the measured movement history information of the base and the movement history information if access to the restricted environment is allowed. The drawback of this approach is that it involves an elaborate method in which a movement property of the device must be continuously detected and movement history information must be stored.

The unexamined application CN 107650862 A discloses a keyless access system for a car based on detection of an approach a smartphone. The keyless access system for the car comprises an information request module, a real-time positioning motor module, an information sending module, a vehicle-mounted device and a cloud platform, wherein the information request module, the real-time positioning motor module and the information sending module are arranged in the smartphone. The information request module is used to request information for the cloud platform; the real-time positioning module is used to achieve accurate and reliable spatial positioning of the smartphone relative to a car. The vehicle-mounted device comprises a vehicle-mounted iBeacon base station, a vehicle-mounted BLUETOOTH® communication module, an information processing module, a car door control module and an engine control module. The information processing module is used for induction control as a vehicle-mounted controller according to the change of a user's spatial position information relative to the car; the cloud platform is used for pre-storing UUID and MAC address information of the vehicle-mounted iBeacon base station of each car and a BLUETOOTH® fingerprint database and threshold information corresponding to each car type. According to the keyless access system for cars, the trouble-free access control and the positioning service are carried out by a highly reliable relative positioning between person and car. The drawback here is that the method is technically complex and can only be used with suitably high-quality network coverage due to the cloud connection.

The unexamined application DE 10 2016 207 997 A1 relates to a method for assessing the reliability of a relative position determination between a device for accessing a transportation vehicle and the transportation vehicle, the method comprising: transmitting a first radio signal from a first antenna of the transportation vehicle; transmitting a second radio signal from a second antenna of the transportation vehicle; receiving the first radio signal and determining a first signal intensity at the device; receiving the second radio signal and determining a second signal intensity at the device; determining, in the device or the transportation vehicle, the relative position of the device and/or the transportation vehicle and the directions from which the radio signals arrived at the device, based on the first signal intensity and the second signal intensity; determining compatibility of the determined relative position and/or the signal directions with an arrangement of the first antenna and the second antenna on the transportation vehicle to assess the reliability of the relative position determination.

The unexamined application DE 10 2015 109 468 A1 relates to an authorization system for transportation vehicles, which comprises at least one authentication element, at least one device for determining the position of the authentication element, and at least one comparison unit, wherein the authentication element, in particular, a key or a Keyless Go mechanism for a transportation vehicle, for example, an transportation vehicle, comprises at least one radio interface for sending and/or receiving at least one vehicle-generated location data signal, at least one inertial sensor element for acquiring inertial data in connection with at least one movement and/or at least one acceleration, and at least one inertial data interface for sending and/or receiving inertial data, wherein the device is intended for vehicle-mounted arrangement, in particular in or on an transportation vehicle, and wherein the device has at least one radio device for sending and/or receiving the location data signal, and at least one location data signal exchange interface for exchanging location signal data with the comparison unit, wherein the comparison unit comprises at least one receiving device for receiving the location signal data and the inertial data, and at least one computing unit for generating comparison data based on the location signal data and the inertial data. The disclosed embodiments also relate to a method for controlling access authorization with an authorization system.

The unexamined application DE 10 2013 225 600 A1 relates to a transportation vehicle system and a method for detecting the position of a portable wireless device. The transportation vehicle system comprises the portable device and a plurality of base stations arranged on a transportation vehicle. The portable device is configured to send a first radio signal and a second radio signal that indicate the movement data of the portable device. A main base station from the plurality of base stations is configured to determine a first final position of the portable device in response to each of the plurality of base stations successfully receiving the first radio signal. The main base station is additionally configured to determine a second final position of the portable device using the first final position and the movement data of the second radio signal received at the first base station, after it has been determined that the second base station has not successfully received the second radio signal.

The unexamined application WO 2016 043 951 A1 relates to a device having a transportation vehicle authorization parameter module, wherein a transportation vehicle authorization parameter comprises at least a movement of a key fob, a received directional signal or a received acoustic signal. The device further comprises a transportation vehicle function compatibility module which is configured: to determine whether the value of the transportation vehicle authorization parameter is consistent or inconsistent with a desired function of the transportation vehicle; to inhibit the desired function of the transportation vehicle in response to the value of the transportation vehicle authorization parameter being inconsistent the desired function of the transportation vehicle; and to allow the desired function of the transportation vehicle to be determined in response to the value of the transportation vehicle authorization parameter being consistent with the desired function of the transportation vehicle.

Disclosed embodiments provide an improved and, in particular, energy-efficient way for providing keyless access to a transportation vehicle. In particular, it is intended to enable improved location determination and an increased range.

This is achieved by a method for determining an approach of a person to a transportation vehicle, having the operations of:

receiving transportation vehicle data with information on a magnetic orientation of the transportation vehicle;

receiving keyless data from a keyless device of the transportation vehicle;

detecting an orientation of a device guided by the person and generating sensor data with information on the orientation of the device;

analyzing the keyless data and determining a distance between the person and the transportation vehicle based on the keyless data; and analyzing the sensor data and the transportation vehicle data and determining a directional vector between the person and the transportation vehicle, based on the sensor data and the transportation vehicle data, wherein the detection of an orientation of a device guided by the person comprises detecting a magnetic orientation.

This is additionally achieved by a computer program having program code mechanism for carrying out all operations of a method as defined above, when the computer program is executed on a computer, a transportation vehicle control unit or a corresponding computing unit.

In addition, this is achieved by a device for determining an approach of the device to a transportation vehicle, the transportation comprising:

a sensor designed for detecting an orientation of the device and for generating sensor data, wherein the sensor has a magnetic field sensor and optionally an acceleration sensor and/or a gyroscope sensor;

an input interface designed to receive keyless data from a keyless device of the transportation vehicle, the sensor data with information on the orientation of the device, and transportation vehicle data with information on a magnetic orientation of the transportation vehicle, and may have sensor data of the acceleration sensor and/or the gyroscope sensor;

an analysis unit designed for analyzing the keyless data and determining a distance between the person and the transportation vehicle based on the keyless data and for analyzing the sensor data and the transportation vehicle data and determining a directional vector between the person and the transportation vehicle based on the sensor data and the transportation vehicle data, and an output interface designed for transmitting the determined directional vector; wherein the detection of an orientation of a device guided by the person comprises detecting a magnetic orientation.

Finally, this is achieved by a system for determining an approach of a person to a transportation vehicle, having:

a device as previously defined, and a transportation vehicle with a keyless entry function.

Keyless data may be BLUETOOTH®, WLAN, or ISM band, for example, 434 MHz, data. Optionally, the aforementioned data types have a higher range than UWB data also belonging to the keyless data. By using the received keyless data, a coordinate origin for distance and/or direction determination can be defined. Also, the range of the approach detection can be increased. By receiving a magnetic orientation of the transportation vehicle, optionally when parking the transportation vehicle, a matching and a plausibility check of an orientation of the device guided by the person can be made. A robust method can be created, which optionally enables faster reactions when opening doors and flaps. Determining a directional vector between the person and the transportation vehicle allows for more precise control of keyless functions of the transportation vehicle. For example, only the side from which the person approaches the transportation vehicle may be illuminated by the transportation vehicle. Furthermore, it is conceivable to open only the driver's door or only a trunk based on the directional vector. In addition, only a low level of computing power may be required, as a vector-based calculation can be carried out efficiently. If UWB data is also available and UWB ranging is performed, an approach can be accurately calculated based on multiple vectors. Measurement errors can be compensated.

In an exemplary embodiment, the following operation is provided: receiving sensor data of an acceleration sensor and/or a gyroscope sensor of the device guided by the person and determining a walking speed of the person and/or a distance of the person from the transportation vehicle based on the sensor data. By determining a walking speed, a time at which the transportation vehicle will be reached can be estimated more accurately. Furthermore, it is conceivable to perform a sampling of the sensor data and/or a determination of the directional vector based on the walking speed. At slow walking speeds, a lower sampling rate may be sufficient to obtain reliable data. An energy-efficient method can be created. It goes without saying that at higher speeds, a more frequent sampling can be performed to ensure sufficient data quality.

In a further exemplary embodiment, the following operation is provided: determining a movement sequence of the person based on the sensor data; and specifying the directional vector based on the determined movement sequence of the person. By taking a movement sequence into account, the directional vector can be specified more accurately, and positioning can be improved. In addition, a keyless function of the transportation vehicle can be controlled more precisely. In particular, it is conceivable to determine a predictive path of the approach based on the movement sequence and to illuminate the path of the approaching person by using the transportation vehicle.

In a further exemplary embodiment, the following operations are provided: receiving keyless data comprising UWB ranging data; determining an additional directional vector, and optionally a connection vector between the directional vector and the additional directional vector, based on the UWB ranging data; and specifying the directional vector based on the additional directional vector and optionally the connection vector. Determining an additional directional vector means that two independent vectors can be calculated and compared. The respective calculations of the directional vector and the additional directional vector have no effect on each other. Robust and reliable positioning of the person or the device can be performed. By using a connection vector, the two independently calculated vectors can be easily combined with each other to determine the location accurately. It goes without saying that one or both of the vectors can be specified more accurately by appropriate measurement error correction methods, such as a Kalman filter.

In a further exemplary embodiment, the following operation is provided: accurately specifying the directional vector by a weighting between the UWB ranging data and the sensor data. A weighting allows the two independently calculated vectors to be combined in a fast and technically simple manner and with little computational effort. In particular, a weighting allows an efficient consideration of estimated measurement errors. For example, an additional directional vector determined by UWB ranging can be weighted by a lesser amount if only a small number of UWB antenna signals have been received.

In a further exemplary embodiment, it is provided that in one or more of the following states the sensor data is weighted higher than the UWB ranging data:

a distance from the transportation vehicle is greater than a predetermined threshold value;

the magnetic orientation of the transportation vehicle and the orientation of the device differ from each other by more than a predetermined threshold value and UWB ranging is not available;

the device is rotated by an angle of rotation of more than 130°;

the device is located in a pocket, in particular a back pocket;

and/or in one or more of the following states, the UWB ranging data is weighted higher than the sensor data:

the distance from the transportation vehicle is lower than a predetermined threshold value;

the magnetic orientation of the transportation vehicle and the orientation of the device differ from each other by less than a predetermined threshold value and UWB ranging is available;

the device is moved in a straight line toward the transportation vehicle;

signals from at least three UWB antennas are received by the device;

the device is moved toward the transportation vehicle at a speed greater than a predefined threshold value.

It is understood that the above-mentioned states are able to be detected by the device and/or the transportation vehicle. In particular, sensor data of an acceleration sensor, a gyroscope sensor and/or a light sensor can be used to detect that the device is located in a pocket. By applying a weighting based on a distance from the transportation vehicle, range rules can be created that define the limits of confidence for the UWB ranging and the sensor data. If the magnetic orientations match, it can be estimated that the device is in the same position as when leaving the transportation vehicle. Consequently, there is a high probability that the person will enter the transportation vehicle. It is understood that a magnetic orientation of the device can be detected with respect to a magnetic orientation of the transportation vehicle when leaving the transportation vehicle and a change in this parameter causes a higher weighting of the sensor data. In particular, a movement of the device in relation to the magnetic orientation of the transportation vehicle can also be detected.

In a further exemplary embodiment, it is provided that the device is part of a smartphone and/or a transportation vehicle key with radio remote control. This allows convenient keyless entry functionality to be achieved. A car key with radio remote control allows convenient use of the keyless-entry functionality without the need for a driver to change their habits. Furthermore, a smartphone can ensure that no additional units need to be carried by the person. A smartphone already has the necessary technical prerequisites, and therefore the keyless entry functionality can be set up, for example, by using an app and appropriate training on the smartphone.

The various exemplary embodiments cited in this application, unless stated otherwise for each case, may be combined with one another.

Ultra-wideband (UWB) technology describes an approach to near-range radio communication for the commercial mass market. Its most important feature is the use of extremely large frequency ranges with a bandwidth of at least 500 MHz or at least 20% of the arithmetic mean value of the lower and upper limit frequencies of the frequency band used.

A keyless transportation vehicle access system, keyless entry or Keyless Go, describes a system for unlocking a transportation vehicle without active use of a car key and to start it by simply pressing the start button. This is made possible by an appropriate key with chip, which the transportation vehicle driver carries with them. Optionally, a keyless entry system operates in automatic mode, so that as soon as the driver with a chip card or a key with a chip approaches the transportation vehicle, the chip card or the key with chip is detected and the transportation vehicle is automatically unlocked when or before a door handle is touched. When the key is removed from the transportation vehicle, the transportation vehicle is automatically locked again.

ISM bands (Industrial, Scientific and Medical Band) refer to frequency bands that can be used by radio frequency devices in industry, science, medicine, in domestic and similar sectors without a license and usually without approval.

Magnetic orientation can be understood in particular to mean an orientation with respect to the Earth's magnetic field.

FIG. 1 shows a device 10 for determining an approach of a person to a transportation vehicle, having an input interface 12, an analysis unit 14, a sensor 16 and an output interface 18. It goes without saying that the input interface 12 and the output interface 18 can also be designed as a combined unit, such as a transceiver. The separate representation selected here is used for better clarity.

The input interface 12 is designed to receive sensor data of the sensor 16 with information on a magnetic orientation of the device 10. The sensor data can also include, in particular, data of an acceleration sensor and/or a gyroscope sensor. Furthermore, the input interface 12 is designed for receiving keyless data of a keyless device of the transportation vehicle and transportation vehicle data with information on a magnetic orientation of the transportation vehicle.

The analysis unit 14 is designed to analyze the sensor data and to determine a directional vector between the person and the transportation vehicle based on the sensor data and the transportation vehicle data. Optionally, the analysis unit 14 can determine a distance between the person and the transportation vehicle.

The sensor 16 may in particular comprise a magnetic field sensor, an acceleration sensor and/or a gyroscope sensor and is designed to generate sensor data with information on an orientation of the device 10, in particular a magnetic orientation of the device 10, a movement, in particular an acceleration and/or an inclination of the device 10.

The output interface 18 is designed to transmit the determined directional vector to a transportation vehicle unit of the transportation vehicle.

Figure 2:
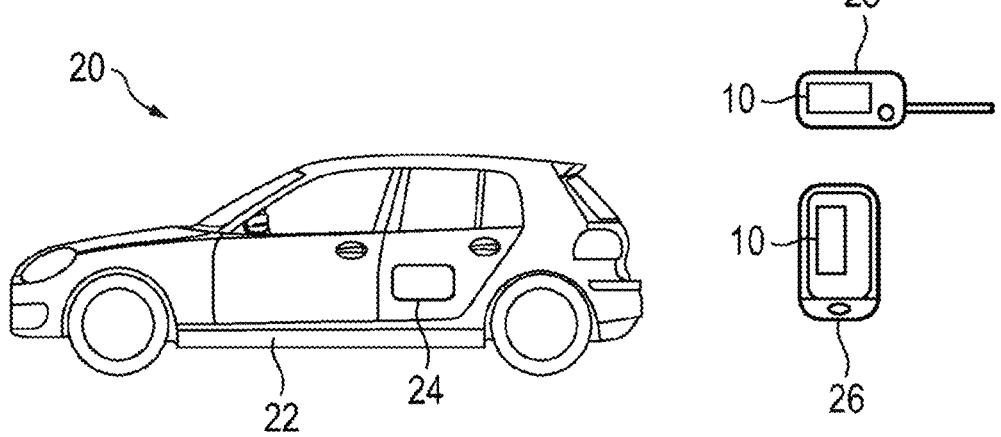
FIG. 2 shows a schematic representation of a system for determining an approach of a person to a transportation vehicle.

In FIG. 2, a system 20 for determining an approach of a person to a transportation vehicle 22 is shown schematically. The system 20 comprises a device 10 as described in FIG. 1, and the transportation vehicle 22 and a keyless device 24. The keyless device 24 is designed to provide a keyless entry function for the transportation vehicle 22. It goes without saying that the keyless device 24 does not necessarily have to be designed as a stand-alone unit but can be part of a control unit.

The device 10 may be part of a smartphone 26 and/or a transportation vehicle key 28 with radio remote control.

Figure 3:
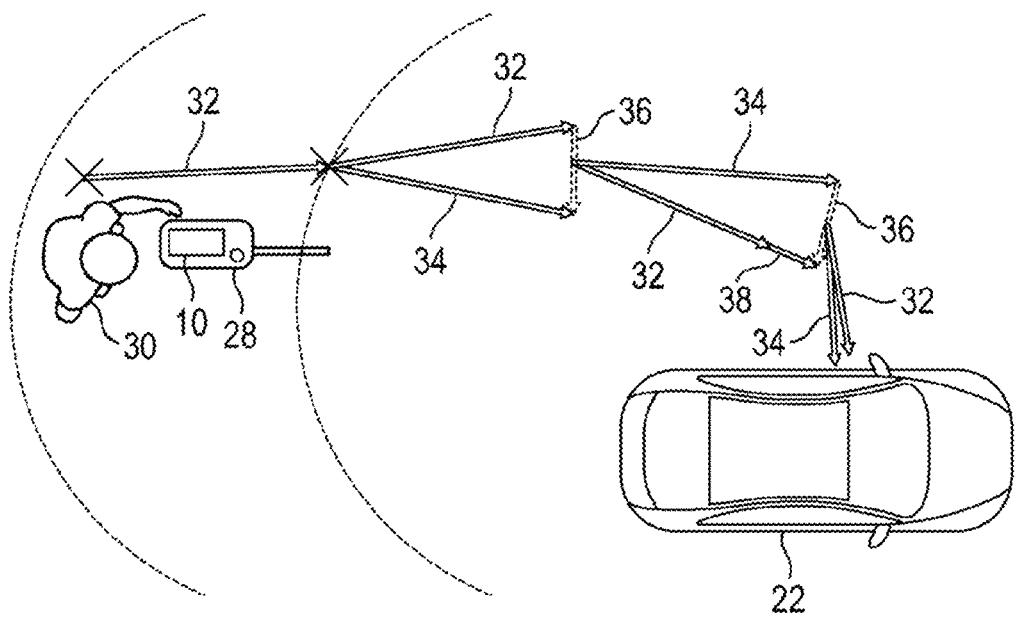
FIG. 3 shows a schematic representation of an approach of a person to a transportation vehicle in a bird's eye view.

In FIG. 3, an approach of a person 30 to a transportation vehicle 22 is illustrated schematically from a bird's eye view. The transportation vehicle 22 has a keyless entry function.

In the example shown, the person 30 is initially located in a first region in which no UWB ranging is available, and is moving towards the transportation vehicle 22. The device 10, which in the example shown is part of a transportation vehicle key 28 with radio remote control, can determine a directional vector 32 along which the person 30 is moving towards the transportation vehicle 22. It is understood that the directional vector 32 can be recalculated at predefined time intervals.

A first contact between the device 10 and the transportation vehicle 22 can be made, for example, by using keyless data such as BLUETOOTH®, WLAN, or ISM-band, for example, 434 MHz, data. The first contact is represented by a cross. Based on a field strength of the keyless data, a distance between the person 30 and the transportation vehicle 22 can be estimated.

If the person 30 is in a second region, in which UWB ranging is also available, an additional directional vector 34 can be determined based on a UWB ranging of the keyless-entry function. Furthermore, the directional vector 32 can be determined once again. The first contact with the UWB ranging of the keyless-entry function is again represented by a cross. The additional directional vector 34 and the directional vector 32 can be connected by a connection vector 36. By using the connection vector 36, a weighting between the additional directional vector 34 and the directional vector 32 can be applied in a technically simple manner. The connection vector 36 can be multiplied by a confidence factor and added to one of the vectors to specify the directional vector 32 more accurately.

It is understood that the above method can be repeated continually during the approach to the transportation vehicle 22. In particular, it is conceivable to determine a walking speed and/or a movement sequence of the person 30 from the sensor data and, based on the walking speed and/or the movement sequence, to determine a sampling rate, i.e., a repetition rate for the above method as a function of the walking speed.

It goes without saying that measurement error correction methods, such as a Kalman filter, can be used. For example, a calculated directional vector 32 can be specified more accurately by using a measurement error correction, for example, a correction vector 38. It is understood that this correction can be made before or after a weighting between the additional directional vector 34 and the directional vector 32. In addition, the weighting can be determined afresh for each calculation.

Figure 4:
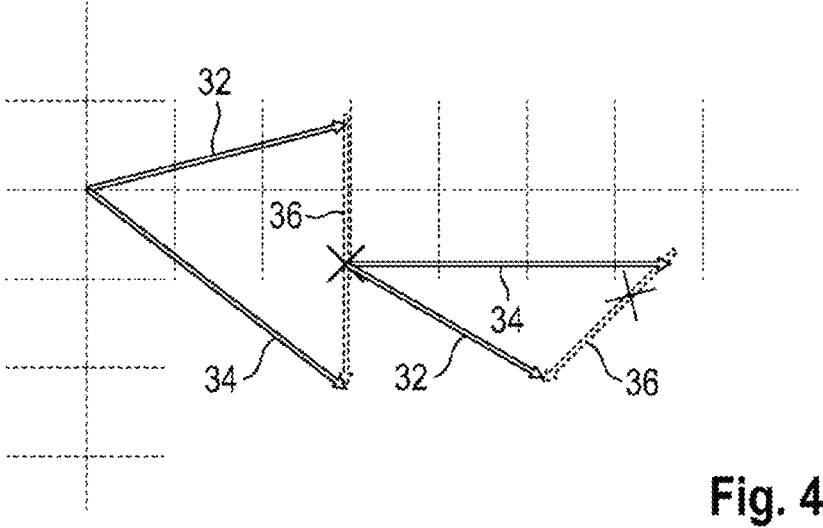
FIG. 4 shows a schematic representation of a method for determining an approach of a person to a transportation vehicle.

In FIG. 4, a method for specifying an approach more accurately is schematically illustrated. In the example shown in FIG. 4, UWB ranging is available, which means that a directional vector 32 and an additional directional vector 34 and a connection vector 36 can be determined. An origin of the two directional vectors 32, 34 can be determined, for example, by using the UWB ranging, or as described above via a field strength measurement. Various factors can be used to determine a degree of confidence or a confidence factor for one or both directional vectors 32, 34. Based on the degree of confidence, the directional vectors 32, 34 can be weighted as described above. The weighting is represented in FIG. 4 by crosses. Starting from the weighting, a new calculation of both directional vectors 32, 34 can be carried out in a next operation.

If a distance to the transportation vehicle 22 is greater than a predetermined threshold value, for example, greater than 4 m, if the magnetic orientation of the transportation vehicle 22 and the orientation of the device 10 deviate from each other by more than a predetermined threshold value and if no UWB ranging is available, if the device 10 is rotated with a rotation angle of more than 130° and/or the device 10 is located in a pocket, in particular a back pocket, the directional vector 32 is assigned a high degree of confidence.

If a distance to the transportation vehicle 22 is lower than a predetermined threshold value, for example, less than 4 m, if the magnetic orientation of the transportation vehicle 22 and the orientation of the device 10 deviate from each other by less than a predetermined threshold value and if no UWB ranging is available, if the device 10 is moving in a straight line, optionally with a speed greater than a predetermined threshold value, towards the transportation vehicle 22 and/or if signals can be received by the device 10 from at least three UWB antennas, the additional directional vector 34 is assigned a high degree of confidence.

Figure 5A:
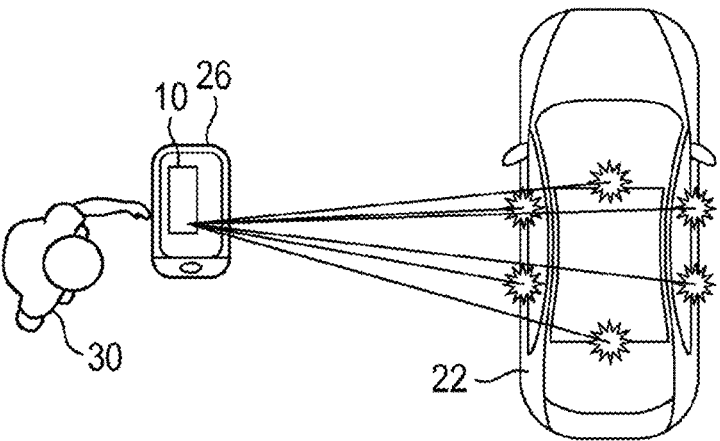
FIG. 5a shows a first example of a schematic representation of a further method for determining an approach of a person to a transportation vehicle.

In FIG. 5*a*, determination of an additional directional vector 34 is shown schematically. If the device 10 receives at least three signals from UWB antennas, the position of the device 10 can be determined by triangulation. If two consecutive locations are evaluated, a direction of movement of the device 10 with respect to the transportation vehicle 22 can also be determined. In the example shown, the device 10, which is part of a smartphone 26, receives signals from six UWB antennas. The UWB antennas are shown as a star and are not designated further.

Figure 5B:
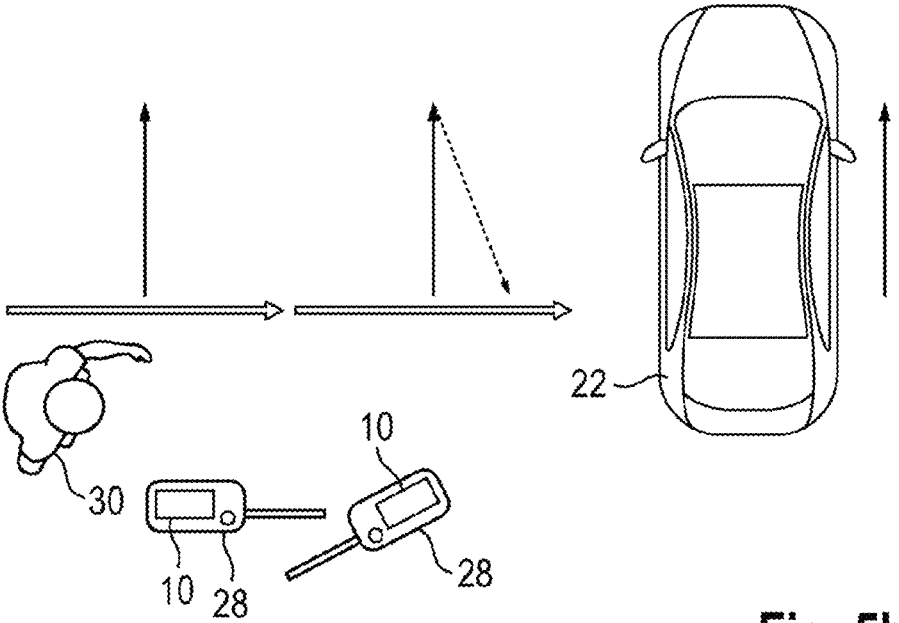
FIG. 5b shows a second example of a schematic representation of a further method for determining an approach of a person to a transportation vehicle.

FIGS. 5*a* and 5*b* schematically illustrate how a movement of the device 10 in relation to a magnetic orientation of the transportation vehicle 22 can be determined. The device 10 can detect a movement with respect to the Earth's magnetic field by using the magnetic field sensor and compare it with a magnetic orientation of the transportation vehicle 22 in the Earth's magnetic field. In FIG. 5*b*, this is illustrated by arrows with solid lines. The device 10 can determine on the basis of the sensor data how the device 10 is moved with respect to the magnetic orientation of the transportation vehicle 22.

If the device 10 is rotated at the same time, the rotation of the device 10 can be compared with the magnetic orientation of the device 10 by using the acceleration and/or gyroscope sensor. As a result, a movement of the device 10 in relation to a magnetic orientation of the transportation vehicle 22 can be determined even if the device 10 is rotated. FIG. 5*b* shows a rotation of the transportation vehicle key 28. The resulting rotation of the magnetic orientation of the device 10 is shown as a dashed arrow. To calculate the movement of the device 10 with respect to the magnetic orientation of the transportation vehicle 22, the rotation of the magnetic orientation resulting from the rotation of the device 10 can be corrected.

It is understood that, in addition or alternatively, the magnetic field sensor can detect the magnetic orientation of the device 10 in the Earth's magnetic field directly and the device 10 can determine a movement of the device 10 with respect to the magnetic orientation of the transportation vehicle 22 by using the acceleration and/or gyroscope sensor.

Figure 6:
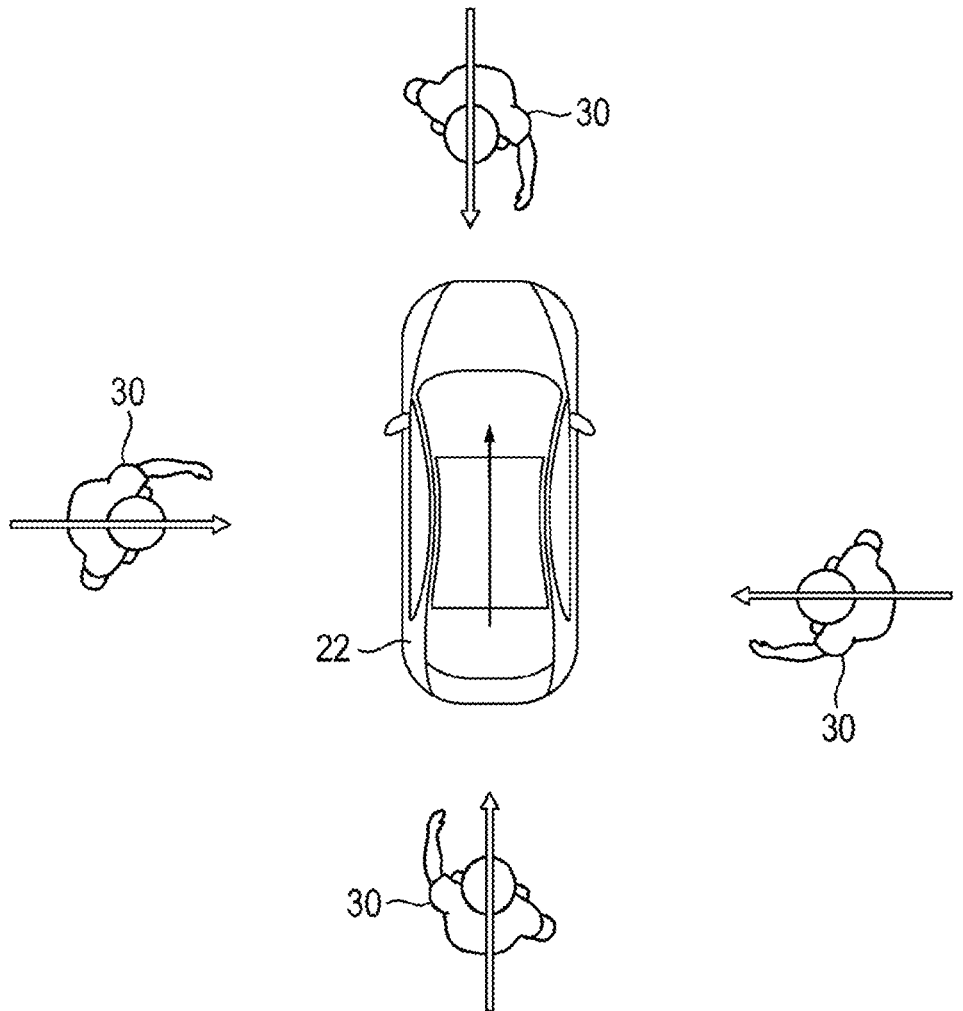
FIG. 6 shows a schematic representation of a method for determining a position during an approach of a person to a transportation vehicle.

FIG. 6 schematically illustrates a method for determining a position during an approach of a person 30 to a transportation vehicle 22. For reasons of clarity, a device 10 guided by a person has not been shown. A magnetic orientation of the transportation vehicle 22 extends from the rear to the front of the transportation vehicle 22 and is indicated by an arrow. A movement of the device 10 with respect to the magnetic orientation of the transportation vehicle is represented by a solid arrow. On the basis of an angle between the movement of the device 10 with respect to the magnetic orientation of the transportation vehicle 22, it is possible to determine from which side of the transportation vehicle 22 the person 30 is approaching the transportation vehicle 22.

If the person 30 is moving along the magnetic orientation of the transportation vehicle 22, it can be ascertained that the person 30 is approaching the transportation vehicle 22 from behind.

If the person 30 is moving opposite to the magnetic orientation of the transportation vehicle 22, it can be ascertained that the person 30 is approaching the transportation vehicle 22 from the front.

If the person 30 is moving at an angle to the magnetic orientation of the transportation vehicle 22, it can be determined that the person 30 is approaching the transportation vehicle 22 from one side.

It is understood that the above-mentioned examples, in particular with regard to magnetic orientation and parallel or perpendicular movement of the person 30, have been selected to illustrate the disclosed embodiments in an easily comprehensible manner and that other orientations than those shown above can also be detected and taken into account.

Figure 7:
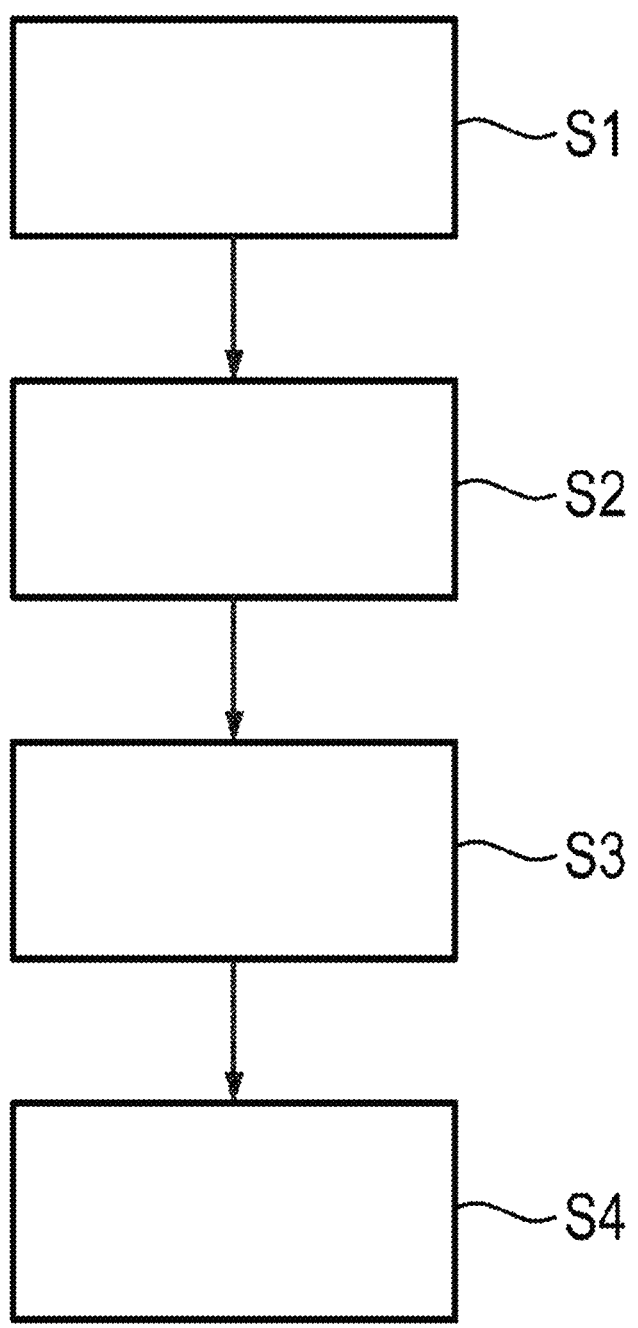
FIG. 7 schematically shows the operations of a disclosed method.

FIG. 7 schematically illustrates the operations of a method for determining an approach of a person 30 to a transportation vehicle 22. The method can be carried out in particular with a device 10 described above and/or a system 20 described above, and additionally comprise the operations already described with respect to the device 10 and/or the system 20.

In a first operation to S1, transportation vehicle data with information about a magnetic orientation of the transportation vehicle 22 is received.

In a second operation to S2, keyless data is received from a keyless device 24 of the transportation vehicle 22.

In a third operation to S3, an orientation of a device 10 guided by the person 30 is detected and sensor data with information on the orientation of the device 10 is generated.

In a fourth operation to step S4, the keyless data is analyzed and a distance between the person 30 and the transportation vehicle 22 is determined based on the keyless data. In addition or alternatively, the sensor data and the transportation vehicle data are analyzed and a directional vector 32 between the person 30 and the transportation vehicle 22 is determined based on the sensor data and the transportation vehicle data.

The detection of an orientation of a device 10 guided by the person 30 comprises detecting a magnetic orientation.

The determined distance and/or the directional vector 32 can be transmitted to the transportation vehicle 22, in particular a keyless device 24 of the transportation vehicle 22.

In particular, the following may be achieved by the disclosed teaching.

Self-learning algorithms can be omitted when implementing the approach detection on and in the transportation vehicle 22.

Only low computing power is required in the smartphone 26 or a radio remote control of the transportation vehicle key 28.

Large fault tolerances of the sensor data or radio technologies UWB, WLAN, BLUETOOTH® and UWB ranging can be compensated.

The number of radio antennas may be lower than in known implementations.

Back-pocket scenarios, i.e., theft by recording and forwarding of data from a smartphone 26 or a radio remote control of the transportation vehicle key 28, can be counteracted.

Predictive movement paths of the approaching person 30 can be calculated.

A faster response when opening doors and flaps can be made by using the keyless device 24.

LIST OF REFERENCE SIGNS

10 device
12 input interface
14 analysis unit
16 sensor
18 output interface
20 system
22 transportation vehicle
24 keyless device
26 smartphone
28 transportation vehicle key
30 person
32 directional vector
34 additional directional vector
36 connection vector
38 correction vector
S1-S4 method operations

The invention claimed is:

1. A method for determining an approach of a person to a transportation vehicle, the method comprising:
   receiving transportation vehicle data with information on a magnetic orientation of the transportation vehicle;
   receiving keyless data including UWB ranging data of a keyless device from the keyless device of the transportation vehicle;
   detecting an orientation of a device guided by the person and generating sensor data with information about the orientation of the device, wherein detecting the orientation of the device guided by the person includes detecting a magnetic orientation of the device; and
   analyzing the keyless data and determining a distance between the person and the transportation vehicle based on the keyless data; and analyzing the sensor data and the transportation vehicle data and determining a directional vector between the person and the transportation vehicle based on the sensor data and the transportation vehicle data,
   wherein a rotation of the device is detected based on sensor data from an acceleration sensor and/or a gyroscope sensor of the device and the sensor data are weighted higher than the UWB ranging data in response to detected rotation of the device being more than a rotation angle of 130°, and/or
   wherein a light sensor of the device is used to determine whether the device is in a pocket of the person and the sensor data are weighted higher than the UWB ranging data in response to determination that the device is in the pocket of the person.

2. The method of claim 1, further comprising
   receiving the sensor data from the acceleration sensor and/or the gyroscope sensor of the device guided by the person and determining a walking speed of the person and/or a distance of the person from the transportation vehicle based on the sensor data.

3. The method of claim 2, further comprising:
   determining a movement sequence of the person based on the sensor data; and
   specifying the directional vector based on the determined movement sequence of the person.

4. The method of claim 1, further comprising:
   determining an additional directional vector based on the UWB ranging data; and
   specifying the directional vector based on the additional directional vector.

5. The method of claim 4, further comprising accurately specifying the directional vector by a weighting between the UWB ranging data and the sensor data.

6. The method of claim 5, wherein, in one or more of the following states, the sensor data is weighted higher than the UWB ranging data:
   a distance from the transportation vehicle is greater than a predetermined threshold value;
   the magnetic orientation of the transportation vehicle and the orientation of the device differ from each other by more than a predetermined threshold value and UWB ranging is not available; and/or
   in one or more of the following states, the UWB ranging data is weighted higher than the sensor data:
   a distance from the transportation vehicle is lower than a predetermined threshold value;
   the magnetic orientation of the transportation vehicle and the orientation of the device differ from each other by less than a predetermined threshold value and UWB ranging is available;
   the device is moved in a straight line toward the transportation vehicle;
   signals from at least three UWB antennas are received by the device; and
   the device is moved toward the transportation vehicle at a speed greater than a predefined threshold value.

7. A non-transitory computer readable medium including a computer program having program code for performing the method of claim 1, when the computer program is executed on a computer, a transportation vehicle control unit or a corresponding computing unit.

8. A device for determining an approach of the device to a transportation vehicle, the device comprising:
   a sensor configured to detect an orientation of the device guided by a person and for generating sensor data, wherein the sensor has a magnetic field sensor, and the detection of the orientation of the device guided by the person includes detection of a magnetic orientation of the device;

an input interface configured to receive keyless data including UWB ranging data of a keyless device from the keyless device of the transportation vehicle, the sensor data including information on the orientation of the device and transportation vehicle data with information on a magnetic orientation of the transportation vehicle;

an analysis unit configured to analyze the keyless data and determine a distance between the person and the transportation vehicle based on the keyless data and configured to analyze the sensor data and the transportation vehicle data and determine a directional vector between the person and the transportation vehicle based on the sensor data and the transportation vehicle data, and an output interface configured to transmit the determined directional vector;

wherein a rotation of the device is detected based on the sensor data from an acceleration sensor and/or a gyroscope sensor of the device and the analysis unit weights sensor data higher than the UWB ranging data in response to detected rotation of the device being more than a rotation angle of 130°, and/or wherein a light sensor of the device is used to determine whether the device is in a pocket of the person and the sensor data are weighted higher than the UWB ranging data in response to determination that the device is in the pocket of the person.

9. The device of claim 8, wherein the device is part of a smartphone and/or a transportation vehicle key with radio remote control.

10. A system for determining an approach of a person to a transportation vehicle, the system comprising:

the device of claim 8; and a transportation vehicle with a keyless entry function.

11. A system for determining an approach of a person to a transportation vehicle, the system comprising:

the device of claim 9; and a transportation vehicle with a keyless entry function.

12. The device of claim 8, wherein sensor data of an acceleration sensor and/or a gyroscope sensor of the device guided by the person is received and a walking speed of the person and/or a distance of the person from the transportation vehicle are detected based on the sensor data.

13. The device of claim 12, wherein a movement sequence of the person is determined based on the sensor data, and the directional vector is specifying based on the determined movement sequence of the person.

14. The device of claim 8, wherein an additional directional vector is determined based on the UWB ranging data, and the directional vector is specified based on the additional directional vector.

15. The device of claim 14, wherein the directional vector is accurately specified by a weighting between the UWB ranging data and the sensor data.

16. The device of claim 15, wherein, in one or more of the following states, the sensor data is weighted higher than the UWB ranging data:

a distance from the transportation vehicle is greater than a predetermined threshold value;

the magnetic orientation of the transportation vehicle and the orientation of the device differ from each other by more than a predetermined threshold value and UWB ranging is not available; and/or in one or more of the following states, the UWB ranging data is weighted higher than the sensor data:

a distance from the transportation vehicle is lower than a predetermined threshold value;

the magnetic orientation of the transportation vehicle and the orientation of the device differ from each other by less than a predetermined threshold value and UWB ranging is available;

the device is moved in a straight line toward the transportation vehicle;

signals from at least three UWB antennas are received by the device; and the device is moved toward the transportation vehicle at a speed greater than a predefined threshold value.

* * * * *